United States Patent
Bedrine et al.

(10) Patent No.: US 10,336,442 B2
(45) Date of Patent: Jul. 2, 2019

(54) NON-LUBRICATED ARCHITECTURE FOR A TURBOSHAFT ENGINE

(75) Inventors: Olivier Bedrine, Bosdarros (FR); Gerard Paty, Uzos (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 868 days.

(21) Appl. No.: 13/703,530

(22) PCT Filed: Jun. 14, 2011

(86) PCT No.: PCT/FR2011/051347
§ 371 (c)(1),
(2), (4) Date: Dec. 11, 2012

(87) PCT Pub. No.: WO2011/157943
PCT Pub. Date: Dec. 22, 2011

(65) Prior Publication Data
US 2013/0089409 A1    Apr. 11, 2013

(30) Foreign Application Priority Data

Jun. 15, 2010 (FR) ...................................... 10 54717

(51) Int. Cl.
*B64C 27/14* (2006.01)
*B64C 27/12* (2006.01)
(Continued)

(52) U.S. Cl.
CPC .............. *B64C 27/12* (2013.01); *F01D 25/22* (2013.01); *F02C 3/103* (2013.01); *F02C 7/06* (2013.01);
(Continued)

(58) Field of Classification Search
CPC .......... B64C 27/12; F01D 25/22; F02C 3/103; F02C 7/06; F02C 7/36; F05D 2220/329
See application file for complete search history.

(56) References Cited

U.S. PATENT DOCUMENTS 2,937,703 A  *  5/1960  Chamberlin ............ B64C 27/14
                                                            244/17.11
3,507,113 A       4/1970  Herrmann et al.
(Continued)

FOREIGN PATENT DOCUMENTS

CN         1639466 A        7/2005
FR         1 561 824        3/1969
(Continued)

OTHER PUBLICATIONS

Office Action dated Jul. 2, 2014 in Chinese Patent Application No. 2011800299836 (submitting English language translation only).
(Continued)

*Primary Examiner* — Kayla McCaffrey
(74) *Attorney, Agent, or Firm* — Oblon, McClelland, Maier & Neustadt, L.L.P.

(57) ABSTRACT

A turbine engine for a helicopter, the helicopter including a main gearbox, a rotor, and a speed-reducing device housed entirely within the main gearbox of the helicopter while also being connected to the rotor, the turbine engine including a casing, a gas generator with a gas generator shaft, and a free turbine for being driven in rotation by a gas stream generated by the gas generator, the free turbine including a free turbine shaft. When the turbine engine is fastened to the gearbox of the helicopter, the free turbine shaft extends axially into the main gearbox of the helicopter to be connected directly to the speed-reducing device.

12 Claims, 3 Drawing Sheets

(51) Int. Cl.
    *F01D 25/22*      (2006.01)
    *F02C 3/10*      (2006.01)
    *F02C 7/06*      (2006.01)
    *F02C 7/36*      (2006.01)

(52) U.S. Cl.
    CPC .......... *F02C 7/36* (2013.01); *F05D 2220/329* (2013.01); *F05D 2220/76* (2013.01); *F05D 2240/51* (2013.01); *F05D 2240/52* (2013.01); *F05D 2240/54* (2013.01); *Y02T 50/671* (2013.01)

(56) References Cited

U.S. PATENT DOCUMENTS

| | | | | |
|---|---|---|---|---|
| 3,703,076 | A * | 11/1972 | Hagemeister | F01D 21/006 415/123 |
| 4,063,850 | A * | 12/1977 | Hueber | F01D 5/026 29/889.2 |
| 4,679,464 | A * | 7/1987 | Castellani | F16F 15/027 188/303 |
| 4,813,228 | A | 3/1989 | Hueller | |
| 4,899,959 | A | 2/1990 | Weiler | |
| 5,977,677 | A | 11/1999 | Henry et al. | |
| 6,364,249 | B1 * | 4/2002 | Morgan | B64C 27/14 244/17.11 |
| 6,892,542 | B2 * | 5/2005 | Voinov | F02C 7/22 60/39.465 |
| 7,025,356 | B1 * | 4/2006 | Cheung | F16J 15/445 277/303 |
| 7,703,290 | B2 * | 4/2010 | Bladon | F01D 3/04 415/107 |
| 7,717,369 | B2 * | 5/2010 | Chaniot | B64C 27/14 244/17.11 |
| 8,061,119 | B2 * | 11/2011 | Agrawal | B64C 27/22 251/63.5 |
| 2003/0168863 | A1 | 9/2003 | Sandrart et al. | |
| 2005/0132693 | A1 * | 6/2005 | Macfarlane | F01D 25/18 60/39.08 |
| 2006/0225431 | A1 | 10/2006 | Kupratis | |
| 2008/0185217 | A1 | 8/2008 | Baude | |
| 2009/0140182 | A1 | 6/2009 | Agrawal et al. | |
| 2009/0211260 | A1 * | 8/2009 | Kesseli | F02C 1/02 60/786 |
| 2010/0080700 | A1 * | 4/2010 | Venter | F01D 25/168 415/229 |
| 2010/0164234 | A1 * | 7/2010 | Bowman | F02C 7/32 290/1 R |
| 2011/0049891 | A1 | 3/2011 | Bedrine et al. | |

FOREIGN PATENT DOCUMENTS

| | | |
|---|---|---|
| FR | 2 831 934 | 5/2003 |
| JP | S 52-25918 A | 2/1977 |
| JP | S 63-19474 | 1/1988 |
| JP | 2005-106016 | 4/2005 |
| JP | 2006-291948 | 10/2006 |
| JP | 2006-300024 | 11/2006 |
| JP | 2008-75648 | 4/2008 |

OTHER PUBLICATIONS

International Search Report dated Aug. 26, 2011 in PCT/FR11/51347 Filed Jun. 14, 2011.
Office Action dated May 12, 2015 in Japanese Patent Application No. 2013-514766 (with English translation).
English Translation of Office Action issued in Japanese Patent Application No. 2013-514766 dated Apr. 19, 2016.

* cited by examiner

NON-LUBRICATED ARCHITECTURE FOR A TURBOSHAFT ENGINE

BACKGROUND OF THE INVENTION

Field of the Invention

The present invention relates to the field of gas turbines and in particular to that of turboshaft engines for flying machines such as helicopters.

The present invention relates more particularly to a turboshaft engine, in particular for a helicopter, having a gas generator and a free turbine driven in rotation by the stream of gas generated by the gas generator.

Description of the Related Art

Traditionally, the gas generator comprises at least a compressor and a turbine that are coupled to rotate together. The principle of operation is as follows: fresh air entering into the engine is compressed as a result of the compressor rotating, prior to being delivered to a combustion chamber where it is mixed with fuel. The gas burnt resulting from the combustion is then exhausted at high speed.

First expansion then takes place in the turbine of the gas generator, during which expansion the turbine extracts the energy needed for driving the compressor and equipment that is essential for proper operation of the gas generator. The equipment is generally located on an accessory box of the gas turbine, which accessory box generally comprises a gearbox.

The turbine of the gas generator does not absorb all of the kinetic energy from the burnt gas, and the excess kinetic energy corresponds to the gas stream that is generated by the gas generator.

The generator thus delivers kinetic energy to the free turbine, such that second expansion takes place in the free turbine, which turbine transforms this kinetic energy into mechanical energy in order to drive a receiver member either directly or via speed-reducer means, where such a receiver member may be the main gearbox (MGB) of a helicopter.

Traditionally, the gas generator, the free turbine, the accessory box, and sometimes the speed reducer all form parts of a single assembly referred to as a turboshaft engine that is designed to be fastened to the floor of a helicopter.

The purpose of the main gearbox of a helicopter is firstly to transmit lift forces from the rotor to the entire structure of the helicopter, and secondly to reduce speed between the engine and the rotor by means of gearing, while also supporting various items of equipment. The main gearbox has its own lubrication system that includes the same oil circuit components as those in the engine.

The speed reducer incorporated in the engine included in the power reduction portion for reducing speed between the free turbine and the main gearbox (MGB) of the helicopter, and the gearing in the accessory gearbox are continuously lubricated by the oil circuit.

Such a lubrication system generally comprises a pump, a filter assembly, pipework, a tank, sensors for monitoring pressure and temperature, a cooling system, and a degassing system.

It can be understood that such a lubrication system is particularly constraining. In particular, it constitutes a source of leaks that can be troublesome for operators, and that requires the pilot to verify oil level. Furthermore, the engine is certified as being capable of withstanding an interruption of lubrication for a given length of time. Finally, the lubrication system is heavy, expensive, and usually polluting.

BRIEF SUMMARY OF THE INVENTION

An object of the present invention is to provide a turbine engine architecture for a helicopter that makes it possible to reduce the size of the lubrication system.

The invention thus firstly provides a helicopter turbine engine, the helicopter comprising a main gearbox, a rotor, and a speed-reducing device housed entirely within the main gearbox of the helicopter while also being connected to said rotor, the turbine engine comprising a casing, a gas generator with a gas generator shaft, and a free turbine for being driven in rotation by a gas stream generated by the gas generator, said free turbine having a free turbine shaft, in which turbine engine, when the turbine engine is fastened to the main gearbox of the helicopter, the free turbine shaft extends axially into the main gearbox of the helicopter in order to be connected directly to the speed-reducer device of the helicopter.

It can thus be understood that the turbine engine of the invention does not have a speed reducer, and preferably does not have an accessory box, unlike the above-described prior art. The speed of the free turbine is reduced solely by the speed-reducer device that is housed in the main gearbox (MGB) of the helicopter. Consequently, it can be understood that the gearing of the speed reducer is lubricated within the MGB by means of its own oil circuit and no longer within the engine as used to be done in the past. By means of the invention, lubrication within the engine is thus significantly reduced.

In the prior art, the free turbine and the gas generator shaft are guided in rotation by rolling bearings. Those bearings also serve to take up the radial and/or axial forces to which the shafts are subjected. In the prior art, those bearings are likewise lubricated by the lubrication system.

Advantageously, the turbine engine of the invention includes at least one non-lubricated bearing arranged radially between the engine casing and the free turbine shaft. By way of example, it is possible to use an air bearing. Consequently, guiding the rotation of the free turbine shaft no longer requires oil lubrication.

Advantageously, at least one non-lubricated bearing is arranged between the gas generator shaft and the engine casing. By way of example, it is possible to use an air bearing. Consequently, rotary guidance of the gas generator shaft no longer requires oil lubrication.

In the prior art, an accessory box made up of gearing forms a part of the speed reducer of the turbine engine. That accessory box serves to drive services that are needed for proper operation of the gas generator and possibly also equipment that is specific to the helicopter, such as air conditioning units or any other accessory. Once more, the gearing of the prior art accessory box is lubricated by the lubrication system.

In the invention, the accessory box may advantageously be incorporated in the MGB and be mechanically connected to the gas generator.

In a variant, the gearing may advantageously be replaced by electric motors associated with respective pieces of equipment, said motors advantageously being connected to an electricity generator, itself directly connected to the gas generator shaft. It is possible to use a high speed generator of the brushless type. Such a generator enables electricity to be generated for powering the electric motors of the various pieces of equipment. In addition, it does not require oil lubrication.

In the prior art turbine engine, the axial forces to which the free turbine shaft and the gas generator shaft are subjected are also taken up by bearings that are oil lubricated.

In the invention the axial forces to which the gas generator shaft is subjected are taken up by a non-lubricated axial abutment device arranged axially between the gas generator shaft and the casing. The abutment device may be an axial air bearing or it may be an axial magnetic bearing, both known from elsewhere.

In a variant, the axial forces to which the gas generator shaft is subjected are taken up by a device for taking up the axial forces of the gas generator shaft, the device being arranged between the main gearbox and the gas generator shaft, or being arranged radially between the free turbine shaft and the gas generator shaft. That device for taking up axial forces is preferably a lubricated axial abutment device, such as a lubricated rolling bearing, that remains incorporated in the main gearbox of the helicopter. Under such circumstances, a sealing gasket is also provided, which gasket is arranged radially between the free turbine shaft and the gas generator shaft, thereby preventing lubricating oil from penetrating into the engine.

It is also specified that the axial forces to which the free turbine shaft is subjected are advantageously taken up by the main gearbox of the helicopter as a result of the free turbine of the invention being designed to be securely fastened to the speed-reducer device.

It can thus be understood that the present invention makes it possible to provide an oil-free architecture for a turboshaft engine, i.e. an architecture that is completely free of any oil lubrication system, thereby remedying the above-mentioned drawbacks.

The present invention also provides a helicopter comprising:
 a main gearbox;
 a rotor;
 a speed-reducer device housed entirely within the main gearbox, while being connected to said rotor; and
 a turbine engine of the invention, the engine casing being fastened to the main gearbox of the helicopter with the free turbine shaft extending axially inside the main gearbox and being directly connected to the speed-reducer device.

Advantageously, the turbine engine further includes a device for taking up axial forces from the free turbine shaft, which device is housed in the main gearbox of the helicopter while being fastened to the shaft of the free turbine.

Preferably, the device for taking up axial forces from the free turbine shaft comprises a rolling bearing mounted between the speed-reducer device and the main gearbox, the rolling bearing co-operating with an axial abutment of the main gearbox. In addition, the free turbine shaft is fastened rigidly to the speed-reducer device. The abutment is positioned so as to hold the free turbine shaft axially, in particular in the event of the forces to which the free turbine shaft is subjected tending to pull it axially towards the tail pipe of the turbine engine.

In order to provide sealing between the helicopter main gearbox and the engine casing, one or more sealing members are provided that may be arranged radially between the free turbine shaft and/or the gas generator shaft, the casing of the main gearbox and/or the engine casing, in order to avoid lubrication oil escaping from the main gearbox.

Finally, the turbine engine preferably includes an electricity generator directly connected to the gas generator shaft, and the helicopter further includes electrical equipment electrically powered by said generator.

BRIEF DESCRIPTION OF THE SEVERAL VIEWS OF THE DRAWINGS

The invention can be better understood and its advantages appear better on reading the following description of two embodiments given by way of non-limiting example. The description refers to the accompanying drawings, in which.

DETAILED DESCRIPTION OF THE INVENTION

Figure 1:
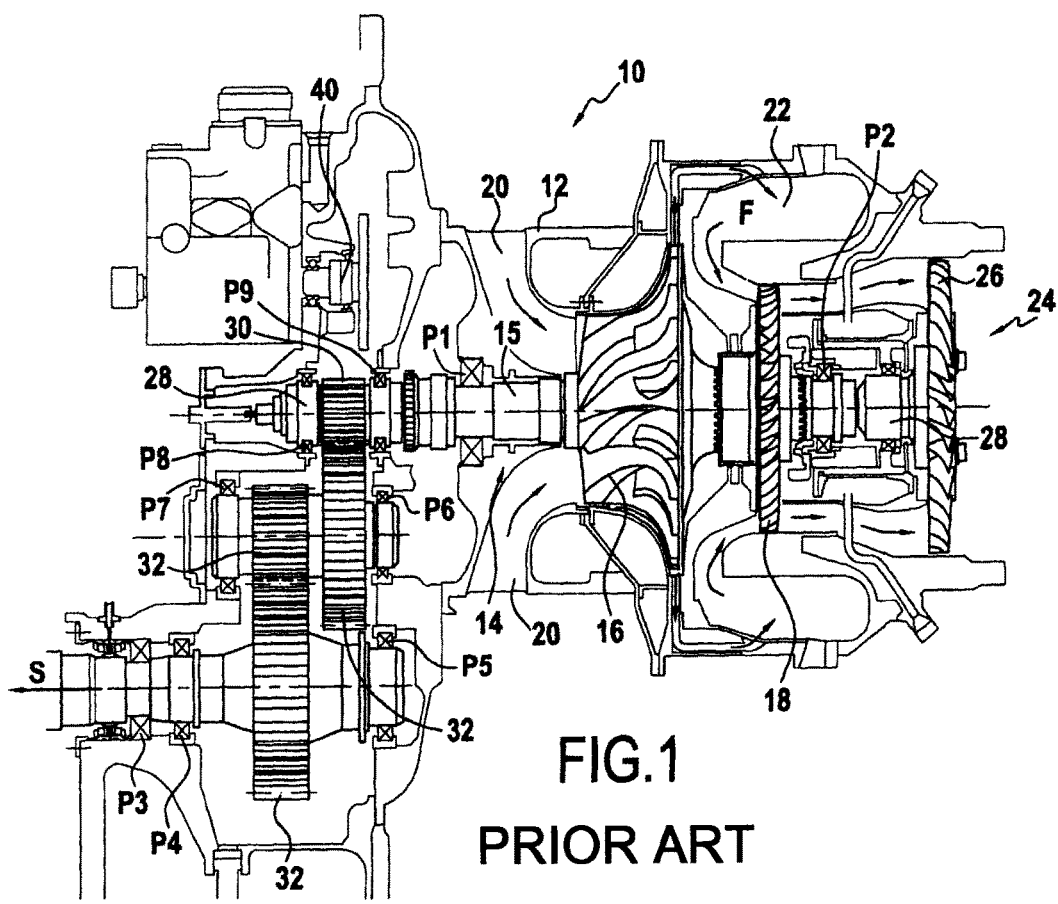
FIG. 1 shows a prior art turboshaft engine.

FIG. 1 is a longitudinal section view of a prior art helicopter turboshaft engine 10. That turboshaft engine 10 comprises a casing 12 housing a gas generator 14. The gas generator has a gas generator shaft 15 carrying a centrifugal compressor wheel 16 and a high pressure turbine 18. Fresh air penetrates into the turboshaft engine via an air inlet 20. It is then compressed by the compressor 16 prior to being sent into a combustion chamber 22 where it is mixed with fuel. The combustion of the mixture of compressed air and fuel generates a gas stream F that drives the high pressure turbine 18 in rotation, which in turn drives the compressor 16. The gas generator is carried by bearings P1 and P2 that provide rotary guidance and that also take up the forces to which the gas generator 15 is subjected. Those bearings are lubricated with oil by means of a lubrication system (not shown). Furthermore, the turboshaft engine also has a free turbine 24 with a low pressure turbine wheel 26 fastened to a free turbine shaft 28. As can be seen in FIG. 1, the low pressure turbine wheel 26 is located downstream from the high pressure turbine wheel 18. Consequently, the stream of burnt gas leaving the gas generator 14 drives rotation of the free turbine shaft 28.

The end of the free turbine shaft 28 is provided with a gearwheel 30 that meshes with toothed wheels 32. This gearing, housed in the speed reducer of the turboshaft engine serves to reduce the speed of rotation of the shaft of the free turbine. The outlet S from this speed reducer is for connecting to the MGB of the helicopter (not shown).

As can be seen in this figure, the gearing 30 or 32 is carried by rolling bearings P3 to P9, which bearings are likewise lubricated by the lubrication system.

An accessory gearbox referenced 40 is also housed in the speed reducer of the turboshaft engine 10. It has gearing for imparting rotary drive to pieces of equipment that are essential for proper operation of the engine and also for providing services that are necessary for the helicopter. This accessory gearbox is likewise lubricated with oil from the lubrication system.

As already explained above, the prior art turboshaft engine cannot operate without a lubrication system.

Figure 4:
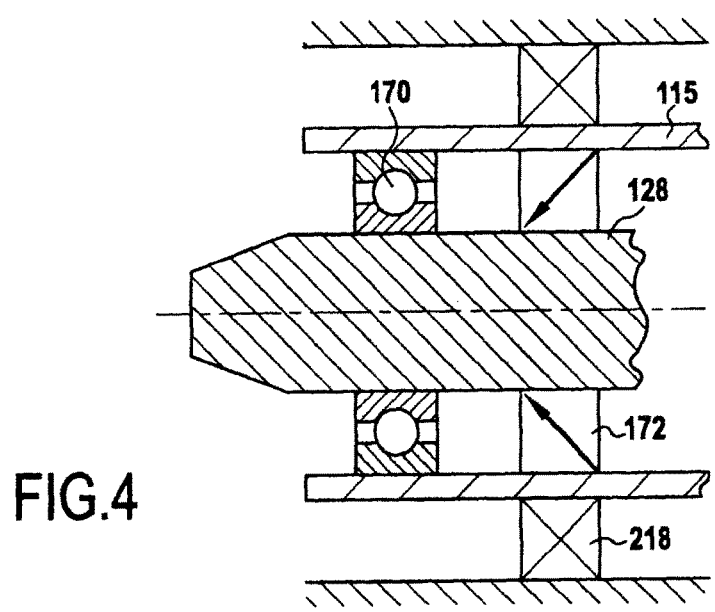
FIG. 4 is a detail view of a variant of the FIG. 2 turbine engine in which the axial force from the shaft of the gas generator of the turbine engine is taken up by the shaft of the free turbine.
Figure 2:
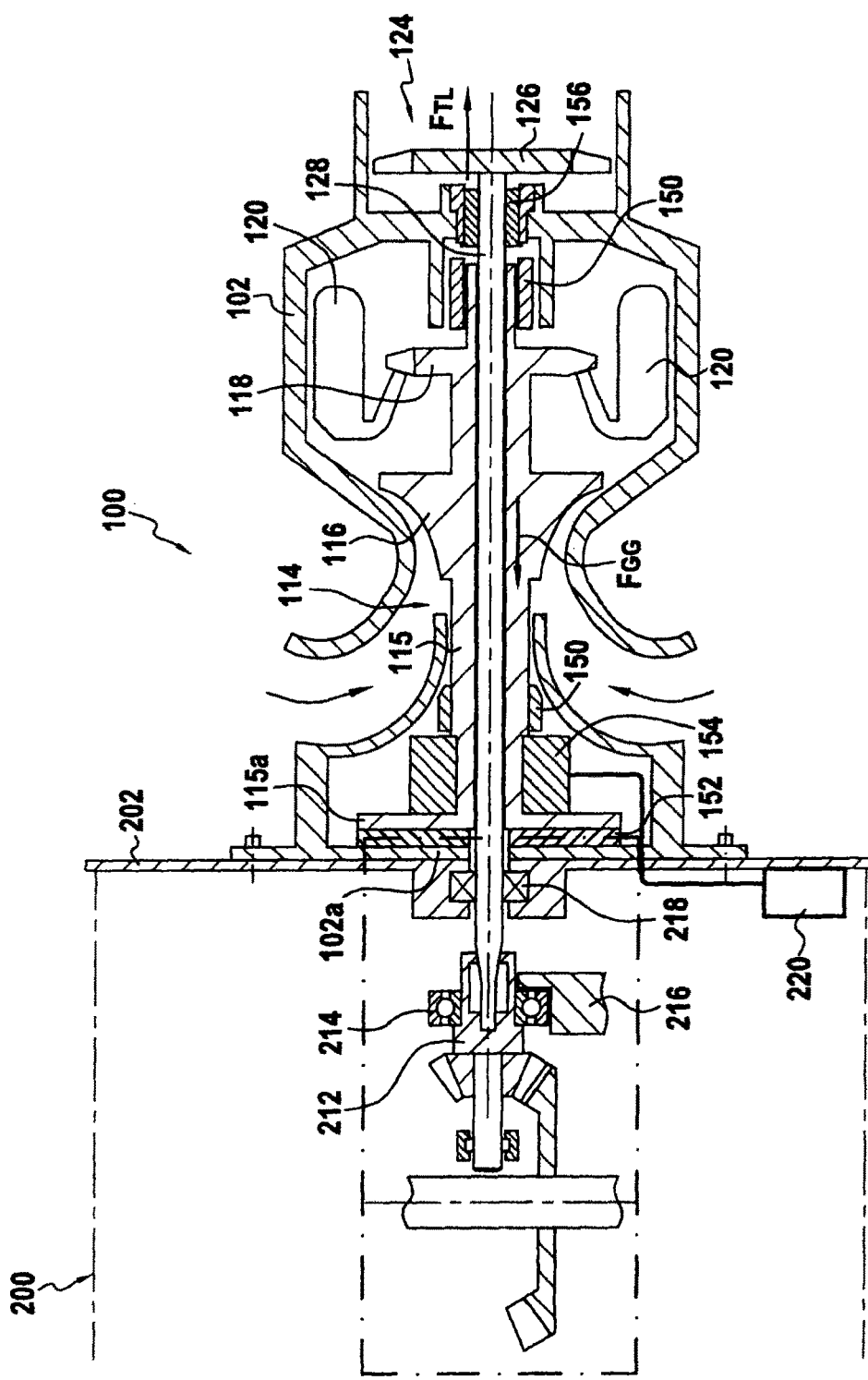
FIG. 2 is a longitudinal section view of a turbine engine of the invention fastened to the main gearbox of a helicopter.
Figure 3:
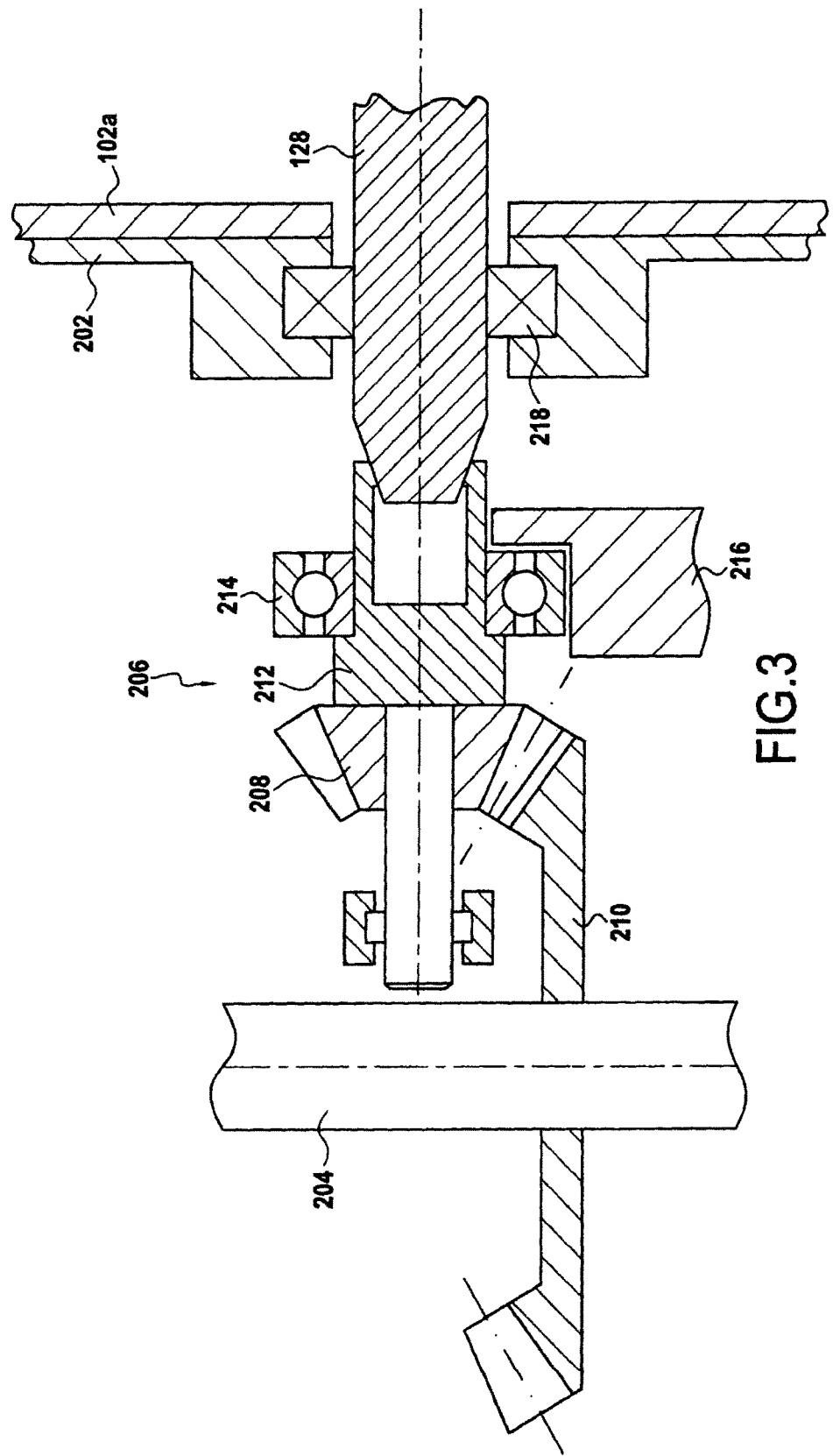
FIG. 3 is a detail view of the connection between the end of the shaft of the free turbine of the FIG. 2 turbine engine and speed-reducing gearing arranged in the main gearbox of the helicopter.

That stated, there follows a description with reference to FIGS. 2 to 4 of a turbine engine architecture 100 of the invention that does not have oil lubrication. According to the invention, the turboshaft engine 100, specifically a helicopter turboshaft engine 100, comprises a casing 102 housing a gas generator 114 comprising a gas generator shaft 115 that carries a centrifugal compressor 116 and a high pressure turbine wheel 118. The turboshaft engine 100 also has a combustion chamber 120. The gas generator 115 is guided in rotation by two non-lubricated bearings, specifically air bearings 150, that are located radially between the gas generator shaft and the casing 102 of the engine. These bearings also serve to take up the radial forces to which the gas generator 115 is subjected. In the example of FIG. 2, the axial forces $F_{GG}$ to which the gas generator 115 is subjected are taken up by a non-lubricated axial abutment device 152 that is located axially between a shoulder 115a of the gas generator shaft 115 and a portion 102a of the casing 102. Specifically, the axial abutment device 152 is an air or magnetic axial abutment. The direction of the axial forces $F_{GG}$ is opposite to the direction in which fresh air is introduced into the engine.

Furthermore, a high speed electricity generator 154 is directly connected to the gas generator 115, This electricity generator is of the brushless type. It serves to generate electricity for powering electrical equipment 220 located in the helicopter.

The engine 100 also has a free turbine 124 having a low pressure turbine wheel 126 fastened to a free turbine shaft 128.

Radial-force takeup and rotary guidance of the free turbine shaft 128 are performed by at least one non-lubricated bearing 156 located radially in the engine casing between the casing 102 and the free turbine shaft 128. This bearing 156 is preferably located close to the free turbine wheel 126. Specifically it is an air bearing.

As can be seen from FIG. 2, the engine 100 is for fastening to a main gearbox 202 of a helicopter 200 so that the free turbine shaft 128 extends inside the main gearbox 202, as can be seen more clearly in FIG. 3.

The helicopter 200, which also constitutes the subject matter of the present invention, has a rotor 204 connected to blades (not shown) and a speed-reducer device 206 that is housed entirely inside the main gearbox 202. The engine 100 does not have its own speed reducer for reducing the speed of the free turbine 128, unlike the prior art.

This speed-reducer device 206 is connected firstly to the rotor 202 via gearing 208, 210, and secondly directly to the free turbine shaft 128 via a coupling sleeve 212 fastened to the power gearwheel 208. The axial forces $F_{TL}$ to which the free turbine shaft 128 is subjected are advantageously taken up by an axial-force takeup device that is constituted, in this example, by a rolling bearing 214 mounted on the sleeve 212 and co-operating with an axial abutment 216 of the main gearbox 202. This abutment takes up the axial forces tending to cause the free turbine shaft 128 to exit from the engine casing. This rolling bearing 214 also serves to take up a fraction of the radial forces to which the free turbine shaft and the power gearwheel 208 are subjected.

This rolling bearing 214 is lubricated by helicopter lubrication means. In order to avoid oil leaking out and in particular into the engine casing, a sealing gasket 218 is placed radially between the free turbine shaft 128 and the main gearbox 202. Another gasket may also be arranged between the free turbine shaft 128 and the engine casing.

With reference to FIG. 4, there follows a description of a variant of the FIG. 2 turboshaft engine and more precisely a variant of the device for taking up axial forces from the gas generator shaft 115. In this variant, a rolling bearing 170 is mounted radially between one end of the gas generator shaft 115 and the free turbine shaft 128. By means of this configuration, the forces to which the gas generator shaft 128 is subjected are taken up by the free turbine shaft 128. Since this bearing 170 is lubricated, a sealing gasket 172 is provided between the gas generator shaft 115 and the free turbine shaft 128 so as to avoid oil leaks. This variant makes it possible to omit the non-lubricated abutment device 152 and thus reduce the cost of the engine.

In the light of the above, it can be seen that the above-described turboshaft engine architecture makes it possible to omit the oil lubrication system.

The invention claimed is:

1. An assembly comprising:
a turbine engine and a main gearbox for a helicopter having a rotor, said main gearbox comprising a speed-reducing device including gearing and a lubricated rolling bearing and housed entirely within the main gearbox while also being connected to the rotor, the turbine engine, not having a speed reducer and free of an oil lubrication system, comprising:
a casing;
a gas generator with a gas generator shaft; and
a free turbine for being driven in rotation by a gas stream generated by the gas generator, the free turbine having a free turbine shaft;
wherein the casing of the turbine engine is fastened to the main gearbox,
wherein a sealing member is arranged between the main gearbox and the casing of the turbine engine,
wherein the free turbine shaft extends axially into the main gearbox to be connected directly to the speed-reducer device via a coupling sleeve provided on a free end of the free turbine shaft, the coupling sleeve being supported by the lubricated rolling bearing, and the lubricated rolling bearing cooperating with an axial abutment of the main gearbox, and
wherein an axis of the free turbine shaft is perpendicular to an axis of the rotor.

2. The assembly according to claim 1, wherein the turbine engine further comprises at least one non-lubricated bearing arranged radially between the casing and the free turbine shaft.

3. The assembly according to claim 1, wherein the turbine engine further comprises at least one non-lubricated bearing arranged radially between the gas generator shaft and the casing.

4. The assembly according to claim 1, wherein the turbine engine further comprises an electricity generator directly connected to the gas generator shaft.

5. The assembly according to claim 1, wherein the turbine engine further comprises a non-lubricated air or magentic axial abutment arranged axially between the gas generator shaft and the casing.

6. The assembly according to claim 1, wherein the turbine engine further comprises another lubricated rolling bearing for taking up axial forces from the gas generator shaft, the another lubricated rolling bearing being arranged radially between the free turbine shaft and the gas generator shaft.

7. The assembly according to claim 6, wherein the turbine engine further comprises a sealing gasket arranged radially between the free turbine shaft and the gas generator shaft.

8. The assembly according to claim 7, wherein the sealing gasket is immediately adjacent to the another lubricated rolling bearing.

9. A helicopter comprising:
a rotor;

and an assembly comprising a turbine engine and a main gearbox according to claim 1, the casing being fastened to the main gearbox of the helicopter with the free turbine shaft extending axially inside the main gearbox and being directly connected to the speed-reducer device.

10. The helicopter according to claim 9, wherein the turbine engine includes an electricity generator directly connected to the gas generator shaft, and wherein the helicopter further includes electrical equipment electrically powered by the generator.

11. An assembly comprising:

a turbine engine and a main gearbox for a helicopter having a rotor, said main gearbox comprising a speed-reducing device including gearing and housed entirely within the main gearbox while also being connected to the rotor, the turbine engine, not having a speed reducer, comprising:

a casing;

a gas generator with a gas generator shaft; and a free turbine for being driven in rotation by a gas stream generated by the gas generator, the free turbine having a free turbine shaft;

wherein the casing of the turbine engine is fastened to the main gearbox, wherein a sealing member is arranged between the main gearbox and the casing of the turbine engine, wherein the free turbine shaft extends axially into the main gearbox to be connected directly to the speed-reducer device via a coupling sleeve provided on a free end of the free turbine shaft, the coupling sleeve being supported by a first lubricated rolling bearing, and the first lubricated rolling bearing cooperating with an axial abutment of the main gearbox, wherein an axis of the free turbine shaft is perpendicular to an axis of the rotor, and wherein the turbine engine further comprises a second lubricated rolling bearing for taking up axial forces from the gas generator shaft, the second lubricated rolling bearing being arranged radially between the free turbine shaft and the gas generator shaft, a sealing gasket being arranged radially between the free turbine shaft and the gas generator shaft.

12. The assembly according to claim 11, wherein the sealing gasket is immediately adjacent to the second lubricated rolling bearing.

* * * * *